J. H. IGO.
JACKING ATTACHMENT FOR MOTOR VEHICLES.
APPLICATION FILED APR. 26, 1920.
1,375,515.
Patented Apr. 19, 1921.
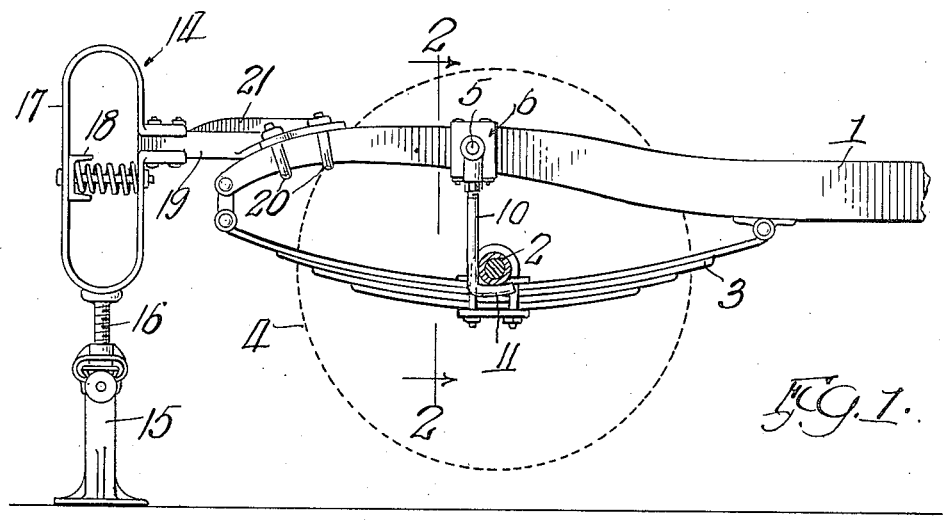
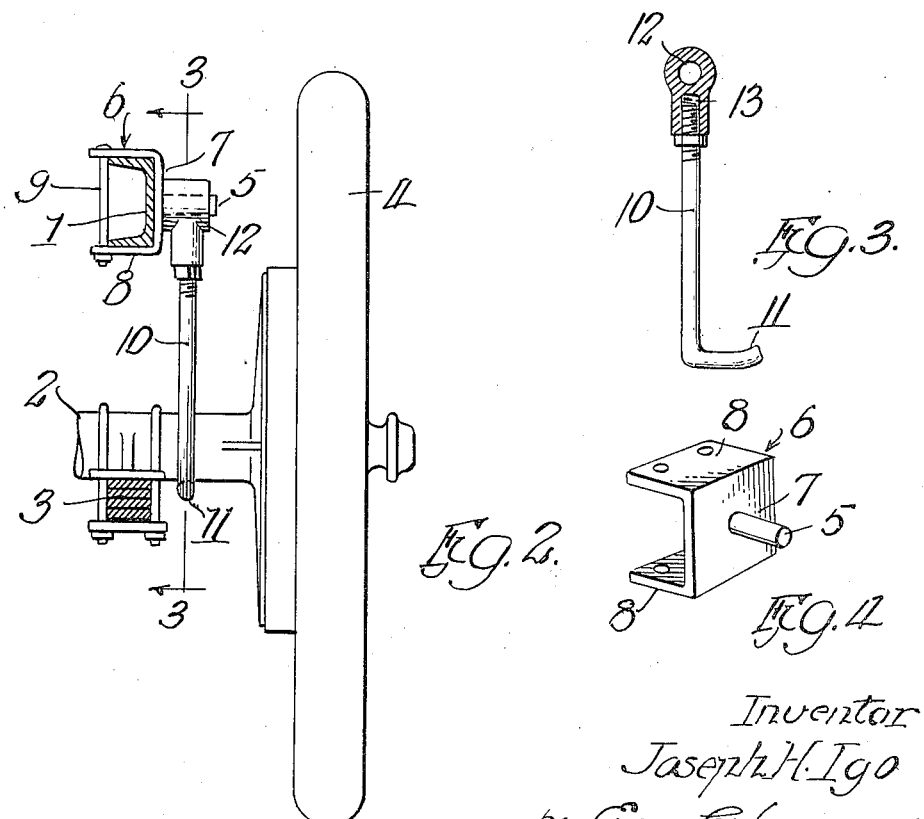
Inventor
Joseph H. Igo

UNITED STATES PATENT OFFICE.

JOSEPH H. IGO, OF CHICAGO HEIGHTS, ILLINOIS.

JACKING ATTACHMENT FOR MOTOR-VEHICLES.

1,375,515. Specification of Letters Patent. Patented Apr. 19, 1921.

Application filed April 26, 1920. Serial No. 376,502.

*To all whom it may concern:*

Be it known that I, JOSEPH H. IGO, a citizen of the United States, residing at Chicago Heights, in the county of Cook and State of Illinois, have invented new and useful Improvements in Jacking Attachments for Motor-Vehicles, of which the following is a specification.

This invention relates to a jacking device for motor vehicles.

In jacking up an axle of a motor vehicle, such as an automobile, it has been necessary heretofore to place the jack under the axle and to be hampered in working or actuating the jack by the parts of the vehicle adjacent the jack, such as, for instance, the bumper rod, the mud guard, the wheel, the part of the frame which extends beyond the axle, and when at the rear of the vehicle, the parts of the equipment usually found there. To place the jack under the axle, it is necessary to reach or in effect crawl under these interfering parts, which not only makes jacking up the axle inconvenient, but soils the hands and the clothes of the person doing the work by contact with these parts.

The object of my invention is to overcome these objections by providing a jacking device which when applied to a motor vehicle will enable an axle thereof to be jacked up without being required to place the jack under the axle or come in contact with the parts of the car adjacent the axle or be hampered or interfered with by said parts when actuating or working the jack or when placing the same in or removing it from its position of use. Moreover, the arrangement is such that the jack may be used at a point beyond the end of the car and thus give a free and uninterrupted place in which to work. Furthermore, the vehicle frame and axle when being jacked up are coupled together to enable the axle to be lifted with the frame and thus permit the upward force of the jack to be applied against the frame at one side of the axle without the vehicle spring flexing during the jacking operation.

The invention consists further in the matters hereinafter described and more particularly pointed out in the appended claims.

In the accompanying drawings—

Figure 1 is a view showing my device applied to the rear end of an automobile for jacking up the axle at that end of the car;

Figs. 2 and 3 are vertical sectional views taken on lines 2—2 and 3—3 of Figs. 1 and 2, respectively; and Fig. 4 is a perspective view of the clip to be hereinafter described.

In the drawings, I have shown my device as applied to an automobile for jacking up the rear axle, but it is to be of course understood that substantially the same construction could be used at the front end of the car for the front axle, with only such changes in the manner of applying the device as may be required by the character of automobile construction at that end of the car. As shown in Fig. 1, the side member 1 of the main frame or chassis of the automobile extends over and to the rear of the rear axle 2, which is below the frame and is connected thereto by a spring 3 of the usual type as employed in automobile construction. The axle is provided at each end with a wheel 4 of the usual character, and the wheel is of course outside of the frame. Applied to the frame member 1, above the axle, is a pin 5 projecting laterally outward therefrom toward the wheel 4, as shown in Fig. 2. This pin is rigidly secured to the frame member 1 by providing it on a clip 6 clamped about the frame. The pin being secured to the clip facilitates applying the same to the frame of a motor car of any make. The clip 6, as shown, is made channel-shaped in cross-section and thus has a vertical web 7 and top and bottom webs 8, 8 to fit over the frame on the outside thereof, bolts 9 being employed to clamp the clip to the frame.

To couple the frame and axle together to enable the axle to be lifted with the frame when an upward force is exerted on the frame at one side of the axle and thus raise the wheel off the ground or roadway, I employ a means in the form of a rod 10. This rod has its lower end 11 hook shaped to engage under the axle 2, as shown in Figs. 1 and 2, and the upper end of the rod is provided with an eye 12 to engage over the pin 5. The rod has a length sufficient to extend from the pin to the axle and couple the two together so that the axle may be lifted with the frame and prevent the spring 3 from flexing and allowing the parts to separate one from the other when the frame is lifted. The rod, by reason of its construction, may be detachably engaged with the parts it couples together so that it may be removed when not being used for jacking purposes and at that time the rod may be carried in the tool box of the car. To enable the rod 10 to be adjusted lengthwise, so as to accommodate it to the distance between the axle and the frame of cars of various makes to which my device may be applied, the eye-piece 12 of the rod is provided with a threaded socket 13 to receive the threaded upper end of the rod, as shown in Fig. 3.

Secured to the frame member 1, to the rear of the axle 2, is a member 14, which extends downward from the frame to a point in a horizontal plane of the axle 2, or to a point at a sufficient distance above the ground or roadway to enable the lifting jack 15 to reach it when placed beneath the same. This member 14 is rigidly connected with the frame 1, and when the stem 16 of the jack is in its lowermost or retracted position, the jack may be readily placed beneath the member. When the jack is operated to raise the member 16, it coming in contact with the lower end of the member 14 serves to exert an upward force on the frame at one side of the axle, and the frame and axle being coupled together by the rod 10 enables the axle to be lifted with the frame and thus raises the wheel 4 off the ground to permit it to be removed from the axle or permit the tire thereon to be changed or for any purpose whatsoever. The member 14, in the form shown in the drawings, is a rear bumper, such as disclosed in my copending application, filed March 10th, 1920, and bearing Serial No. 364,721. This bumper, generally, comprises two vertically arranged guards 17 (only one being shown) secured to and extending above and below the horizontal bumper bar 18 to the rear of the car. There is a bumper guard 17 at each side of the car in alinement with the side members 1 of the frame or chassis, as disclosed in my copending application, and each guard is rigidly secured to the associated side member of the frame by an arm 19 attached to the frame by U-bolts 20, and reinforced by a strengthening rib 21, so that it will not be bent upward when the jack exerts a lifting force on the guard to raise the frame and the axle coupled thereto by the rod 10.

The member 14, being to the rear or one side of the axle and being free of the mud guard and other parts applied to the frame adjacent the axle, is thus free of such parts and permits the placing of the jack in a position where it may be operated freely and without interference by the parts mentioned. Thus, manifestly, to jack up the axle by my device, it is unnecessary to place the jack under the axle or to be hampered for room in which to work the jack or to come in contact with the parts of the car about the axle, and thus avoid not only soiling the hands but also the clothing of the person doing the work. Application of the rod 10 in position to couple the frame and axle together may be accomplished with ease, as it is only necessary to reach around the wheel and place the rod in position.

While I have shown and described herein in detail a jacking device of my invention, it is to be of course understood that the same may be changed and modified without departing from the spirit and scope of my invention.

I claim as my invention:

1. The combination with the frame of a vehicle and the axle beneath the same and a spring yieldably connecting the frame and axle together, of a coupling device including means adapted to be engaged with the frame above the axle and to be extended to and engage the axle beneath the same to couple the axle and frame together to enable the axle to be lifted with the frame when an upward force is exerted on the frame at one side of the axle.

2. The combination with the frame of a vehicle and the axle beneath the same and a spring yieldably connecting the frame and axle together, of a coupling device including a rod adapted to be engaged with the frame above the axle and to be extended down to and engage the axle beneath the same to couple the axle and frame together to enable the axle to be lifted with the frame when a jack is used to exert an upward force on the frame at one side of the axle.

3. The combination with the frame of a vehicle and the axle beneath the same and a spring yieldably connecting the frame and axle together, of a coupling device including a pin adapted to be secured to the frame above the axle and extending laterally from the frame, and a rod adapted to be engaged with the pin at its upper end and to extend down to and engage the axle beneath the same to couple the frame and axle together to enable the axle to be lifted with the frame when a jack is used to exert an upward force on the frame at one side of the axle.

4. The combination with the frame of a vehicle and the axle beneath the same and a spring yieldably connecting the frame and axle together, of a coupling device including a clip adapted to be clamped to the frame above the axle and having a laterally projecting pin, and a rod provided with an eye at its upper end to engage said pin and a hook at its lower end to engage said axle beneath the same to couple the frame and axle together to enable the axle to be lifted with the frame when a jack is used to exert an upward force on the frame at one side of the axle.

5. The combination with the frame of a vehicle and the axle beneath the same and a spring yieldably connecting the frame and axle together, of a coupling device comprising means adapted to be engaged with the frame above the axle and to extend down to and engage the axle beneath the same to couple the axle and frame together to enable the axle to be lifted with the frame, and means connected with the frame at one side of the axle and extending below the frame to be engaged by a jack placed beneath the same for lifting the axle with the frame.

6. The combination with the frame of a vehicle and the rear axle beneath the same and a spring yieldably connecting the frame and axle together, of a coupling device comprising a rod adapted to be engaged with the frame above the axle and to be extended down to and engage the axle beneath the same to couple the frame and axle together to enable the axle to be lifted with the frame, and a vertically arranged member beyond the rear end of the frame and rigidly connected thereto and extending downward below the frame to a point enabling a lifting jack to be placed under and engage the same for lifting the axle with the frame.

7. The combination with the frame of a vehicle and the rear axle beneath the same and a spring yieldably connecting the frame and axle together, of a coupling attachment comprising a clip adapted to be clamped to the frame above the axle and having a pin projecting laterally therefrom, a rod provided with an eye at its upper end to engage said pin and a hook at its lower end to engage said axle beneath the same to couple the frame and axle together to enable the axle to be lifted with the frame, and a vertically arranged member beyond the rear end of the frame and rigidly secured thereto and extending downward below the frame to a point enabling a lifting jack to be placed under and engage the same for lifting the frame and axle together.

8. The combination with the frame of a vehicle and the rear axle beneath the same and a spring yieldably connecting the frame and axle together, of a coupling attachment comprising a clip adapted to be clamped to the frame above the axle and having a laterally projecting pin, a rod provided with an eye at its upper end to engage said pin and a hook at its lower end to engage said axle beneath the same to couple the frame and axle together to enable the axle to be lifted with the frame, said rod being made in two parts connected together in a manner permitting the length of the rod to be adjusted, and a member connected with the frame to rear of the axle and extending below the frame to a point permitting a lifting jack to be placed beneath and engage the same for lifting the axle with the frame.

In testimony that I claim the foregoing as my invention I affix my signature this 23 day of April, A. D. 1920.

JOSEPH H. IGO.